(12) United States Patent
Abrahams et al.

(10) Patent No.: US 10,248,711 B2
(45) Date of Patent: Apr. 2, 2019

(54) REPRESENTATION OF TIME-SENSITIVE AND SPACE-SENSITIVE PROFILE INFORMATION

(71) Applicant: International Business Machines Corporation, Armonk, NY (US)

(72) Inventors: Faried Abrahams, Laytonsville, MD (US); Amol A. Dhondse, Pune (IN); Anand Pikle, Pune (IN); Gandhi Sivakumar, Melbourne (AU); Lennox E. Thomas, Decatur, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 620 days.

(21) Appl. No.: 14/606,058

(22) Filed: Jan. 27, 2015

(65) Prior Publication Data
US 2016/0217195 A1    Jul. 28, 2016

(51) Int. Cl.
G06F 17/30    (2006.01)
H04L 29/08    (2006.01)

(52) U.S. Cl.
CPC ...... *G06F 17/30592* (2013.01); *H04L 67/306* (2013.01)

(58) Field of Classification Search
CPC ................................................ G06F 17/30592
See application file for complete search history.

(56) References Cited

U.S. PATENT DOCUMENTS

| 8,489,596 B1* | 7/2013 | Milton .............. G06Q 30/02 455/456.1 |
| 2007/0219659 A1 | 9/2007 | Abhyanker et al. |
| 2009/0048767 A1 | 2/2009 | Vaughn |
| 2010/0082780 A1* | 4/2010 | Muilenburg ........ G06F 17/3089 709/221 |

(Continued)

OTHER PUBLICATIONS

"List of IBM Patents or Patent Applications Treated as Related" 1 page.

(Continued)

*Primary Examiner* — Jeff A Burke
*Assistant Examiner* — Cindy Nguyen
(74) *Attorney, Agent, or Firm* — Christopher K McLane; Andrew M. Calderon; Roberts Mlotkowski Safran Cole & Calderon P.C.

(57) ABSTRACT

A method and associated systems for a multidimensional information repository for managing dynamic time-sensitive and space-sensitive user profiles. A profile-management system receives an incoming event that identifies a user profile and is associated with a location, a time period, and a subject. The system searches the repository for records that identify the profile, location, time period, and subject and creates any such records that do not already exist. The system then creates time-sensitive and space-sensitive linkages that link the user profile record to the location, time-period, and subject records. The system dynamically updates these linkages in response to changes to the user profile and uses the linkages to assign context to queries submitted to a (Continued)

main database. In another embodiment, the system recommends additional linkages based on patterns identified in the newly created linkages.

20 Claims, 4 Drawing Sheets

(56) References Cited

U.S. PATENT DOCUMENTS

| | | | |
|---|---|---|---|
| 2012/0290950 A1* | 11/2012 | Rapaport | H04L 51/32 715/753 |
| 2013/0018957 A1* | 1/2013 | Parnaby | G06Q 10/10 709/204 |
| 2013/0097246 A1 | 4/2013 | Zifroni et al. | |
| 2013/0097715 A1 | 4/2013 | Fourman | |
| 2013/0198308 A1* | 8/2013 | Yang | H04L 51/14 709/206 |
| 2014/0143061 A1 | 5/2014 | Abhyanker | |
| 2014/0372250 A1* | 12/2014 | Dugan | G06Q 30/0631 705/26.7 |
| 2017/0154376 A1 | 6/2017 | Mirchandani et al. | |

OTHER PUBLICATIONS

Specification "Personalized Content and Services Based on Profile Information" for related U.S. Appl. No. 14/858,407, 42 pages.
Peng etal., The Multi-Agents Mechanism Applied in Mobile GIS, 0-7803-9335-X/05 copyright 2005 IEEE, pp. 1365-1369.
Wyman, B., Facilitating Profiling-Based Linkage Ordering, Original Publication Date: Jan. 1, 1996, IP.com No. 000117191, 3 pages.
Naranjo et al., Rich Media Visualization for Geo-Spatial Mapping Platforms, Original Publication Date: Apr. 22, 2009, IP.com No. IPCOM000182021D, 10 pages.
Office Action dated Sep. 7, 2017 in related U.S. Appl. No. 14/858,407, 18 pages.
Final Office Action dated Apr. 16, 2018 in related U.S. Appl. No. 14/858,407, 11 pages.

* cited by examiner

REPRESENTATION OF TIME-SENSITIVE AND SPACE-SENSITIVE PROFILE INFORMATION

TECHNICAL FIELD

The present invention relates to creating and maintaining user profiles.

BACKGROUND

A business-automation system may store data related to a customer in a user profile. Data in such a profile may be organized as a simple flat table, as a hierarchical data structure, or distributed among multiple, linked, data structures that may themselves be distributed among multiple systems. In some cases, a user profile may span one or more complex objects, at least one of which may comprise both data and logic.

Information represented by a user profile may be time-sensitive or space-sensitive. A profile might, for example, identify a seasonal client's account that is more active during certain times of the year. Marketing to such an account might thus be more efficient and effective when taking into account this time-sensitive characteristic of the client.

Similarly, some user profiles may be associated with specific geographical or geospatial locations. A social-network user who resides in a coastal city, for example, would be a better candidate for a line of surfer's accessories than she would have been when previously living in a mountainous, landlocked region.

Present solutions do not provide a standard framework that allows a business to model, instantiate, store, manage, and retrieve such user profiles as functions of time- and space-sensitive parameters. Such limitations are particularly troublesome in modern multi-tenant virtual environments, distributed and enterprise networks, cellular networks, and cloud-computing platforms. Such environments serve enormous numbers of users that may be located anywhere in the world and that may each be associated with time-sensitive or space-sensitive characteristics.

Existing solutions excel at storing, analyzing, and retrieving huge volumes of user data in a single dimension, as a single-parameter function of a particular type of subject matter, such as an interest in a particular product line. Some methods may even aggregate data from multiple sources in order to present multiple views of a user.

But even these approaches are generally constrained by resource limitations that prevent them from accounting for ad hoc effects of dynamic time-sensitive or location-sensitive factors. Within such a relatively static framework, a profile may, for example, associate a user with a particular subject, but would incur an impractical degree of overhead if it attempted to derive insight from such an association as a function of ad hoc or evolving time- and space-sensitive context. Traditional methods thus cannot efficiently provide such multi-dimensional solutions that provide accurate results with a high level of confidence.

BRIEF SUMMARY

A first embodiment of the present invention provides a profile-management system comprising a computer processor, a memory coupled to the processor, a computer-readable hardware storage device coupled to the processor, and a multidimensional information repository that comprises a profile set of user-profile records that each identifies a user profile of a plurality of user profiles, a geospatial-map set of location records that each identifies a location of a plurality of locations, a time-graph set of time-period records that each identifies a time period of a plurality of time periods, and a subject-dictionary set of subject-matter records that each identifies a subject of a plurality of subjects, wherein the storage device stores program code configured to be run by said processor via the memory to implement a method for managing dynamic time-sensitive and space-sensitive user characteristics, the method comprising:

the system receiving an inbound event that is associated with a first user profile, a first location, a first time period, and a first subject;

the system searching the profile set for a user-profile record associated with the first user profile and adding such a record to the profile set if none already exists;

the system searching the geospatial map for a location record associated with the first location and adding such a record to the geospatial map if none already exists;

the system searching the time graph for a time-period record associated with the first time period and adding such a record to the time graph if none already exists;

the system searching the subject dictionary for a subject-matter record associated with the first subject and adding such a record to the subject dictionary if none already exists; and the system creating a set of space-sensitive and time-sensitive linkages, wherein the linkages link the record associated with the first user profile to the record associated with the first location, the record associated with the first time period, and the record associated with the first subject.

A second embodiment of the present invention provides a method for maintaining a multidimensional information repository for managing dynamic time-sensitive and space-sensitive user characteristics, wherein the multidimensional information repository comprises a profile set of user-profile records that each identifies a user profile of a plurality of user profiles, a geospatial-map set of location records that each identifies a location of a plurality of locations, a time-graph set of time-period records that each identifies a time period of a plurality of time periods, and a subject-dictionary set of subject-matter records that each identifies a subject of a plurality of subjects, the method comprising:

a profile-management system receiving an inbound event that is associated with a first user profile, a first location, a first time period, and a first subject;

the system searching the profile set for a user-profile record associated with the first user profile and adding such a record to the profile set if none already exists;

the system searching the geospatial map for a location record associated with the first location and adding such a record to the geospatial map if none already exists;

the system searching the time graph for a time-period record associated with the first time period and adding such a record to the time graph if none already exists;

the system searching the subject dictionary for a subject-matter record associated with the first subject and adding such a record to the subject dictionary if none already exists; and the system creating a set of space-sensitive and time-sensitive linkages, wherein the linkages link the record associated with the first user profile to the record associated with the first location, the record associated with the first time period, and the record associated with the first subject.

A third embodiment of the present invention provides a computer program product, comprising a computer-readable hardware storage device of a profile-management system, wherein the storage device stores a computer-readable program code configured to be executed by a processor of the profile-management system to implement a method for maintaining a multidimensional information repository for managing dynamic time-sensitive and space-sensitive user characteristics, wherein the multidimensional information repository comprises a profile set of user-profile records that each identifies a user profile of a plurality of user profiles, a geospatial-map set of location records that each identifies a location of a plurality of locations, a time-graph set of time-period records that each identifies a time period of a plurality of time periods, and a subject-dictionary set of subject-matter records that each identifies a subject of a plurality of subjects, the method comprising:

the profile-management system receiving an inbound event that is associated with a first user profile, a first location, a first time period, and a first subject;

the system searching the profile set for a user-profile record associated with the first user profile and adding such a record to the profile set if none already exists;

the system searching the geospatial map for a location record associated with the first location and adding such a record to the geospatial map if none already exists;

the system searching the time graph for a time-period record associated with the first time period and adding such a record to the time graph if none already exists;

the system searching the subject dictionary for a subject-matter record associated with the first subject and adding such a record to the subject dictionary if none already exists; and the system creating a set of space-sensitive and time-sensitive linkages, wherein the linkages link the record associated with the first user profile to the record associated with the first location, the record associated with the first time period, and the record associated with the first subject.

DETAILED DESCRIPTION

The methods, systems, and apparatus of the present invention provide a technical advantage over the approaches described above by defining a standard way to represent time- and space-sensitive linkages and data elements in a user profile. This is accomplished by means of an object-oriented modelling framework that represents space- and time-sensitive parameters as objects and uses inter-object linkages to represent associations between a user, related subjects, and space- and time-sensitive contextual elements.

A model represented by such a framework may map a geospatial location (such as a city, physical address, zip code, or coordinates of latitude and longitude) and a time range or duration (such as might be identified by a start time and an end time) onto a user profile. Embodiments may also offer an ability to create linkages between a profile and one or more subject areas, such that the linkages provide time- and space-related context to a relationship between a user and a subject of interest. The result in a multidimensional object graph that, in some embodiments, may be represented as a sparse, distributed multi-dimensional sorted map. Other graphical or mathematical methods of representation, as are known to those skilled in the art, may also fall within the scope of embodiments of the present invention.

Embodiments may further associate each object instance in such a graph with multiple dimensional elements. An instance of a profile object that represents a user account may, for example, be associated by linkage to an instance of a subject-area object, where that linkage identifies a context of a particular geospatial location and time range.

Embodiments of the present invention thus solve problems described above and offer the following technical advantages over existing solutions:

An ability to represent characteristics of a real-world user profile as a function of time-sensitive and space-sensitive parameters;

A dynamic run-time framework that organizes data elements and identifies and analyzes actual usage of that data across multiple dimensions;

An ability to accommodate multiple transformations, such as aggregation and data-filtering, as function of multi-dimension associations with time and location;

An ability to organize, query, and update data as functions of a combination of dynamic and static dimensions (such as combinations of conventional query parameters with parameters that are sensitive to time or location) in order to generate dynamic, reusable result sets;

A flexible platform that allows IaaS/PaaS cloud-service providers to deliver services that provide more personalized, user-centric, and accurate outcomes;

Sufficient scalability to handle very large real-world data sets, such as those generated by social-media applications, global customer bases, and machine-generated events;

An ability to dynamically enhance or update stored records by instantiating new, ad hoc time- and space-sensitive objects and linkages whenever needed;

An ability to continuously self-learn, by recognizing time- and space-sensitive patterns in user behaviors represented by objects and linkages, and to use self-learned observations to infer further patterns in user records; and An ability to reallocate time-sensitive or space-sensitive characteristics of a user profile in multiple dimensions, as a function of user behavioral patterns.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1A:
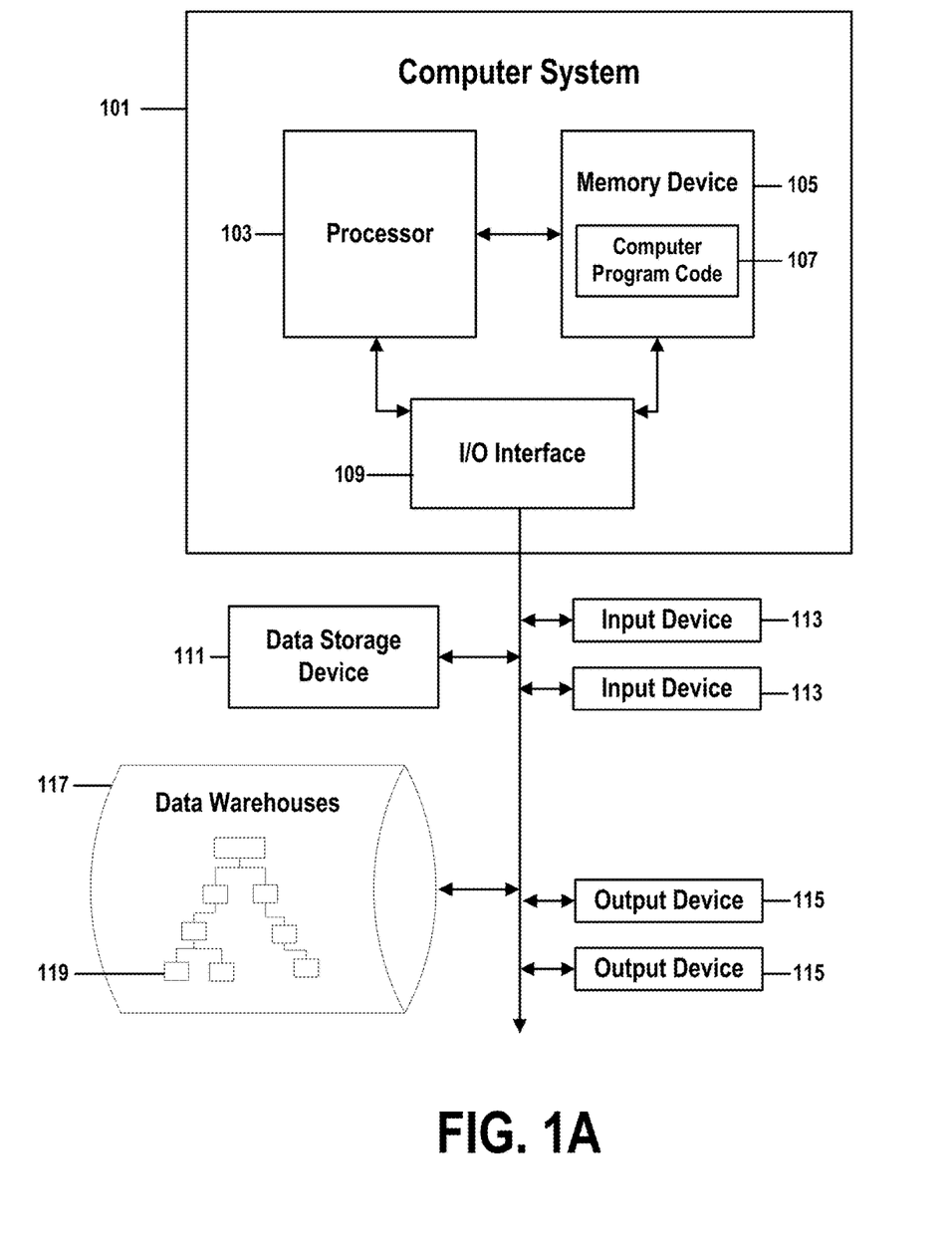
FIG. 1A shows a structure of a profile-management system that includes a computer system, one or more data warehouses that store a dynamic multidimensional information repository for managing dynamic time-sensitive and space-sensitive user characteristics, and computer program code that may be used to implement a method for creating and maintaining the multidimensional information repository in accordance with embodiments of the present invention.

FIG. 1A shows a structure of a profile-management system that includes a computer system, one or more data warehouses that store a dynamic multidimensional information repository for managing dynamic time-sensitive and space-sensitive user characteristics, and computer program code that may be used to implement a method for creating and maintaining the multidimensional information repository in accordance with embodiments of the present invention. FIG. 1A refers to objects 101-119.

In FIG. 1A, computer system 101 comprises a processor 103 coupled through one or more I/O Interfaces 109 to one or more hardware data-storage devices 111 and 117 and to one or more I/O devices 113 and 115.

Hardware data-storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data-storage devices 111, input devices 113, and output devices 115 may be located either locally or at remote sites from which they are connected to I/O Interface 109 through a network interface.

Data warehouses 117 may comprise any combination of devices similar to those described above as data-storage devices 111. These warehouses may be distributed across multiple storage devices, sites, business units, systems, or computing platforms or cloud-computing environments. In embodiments, these data warehouses may each store all or part of an implementation of a multidimensional information repository 119 in accordance with embodiments of the present invention.

Figure 1B:
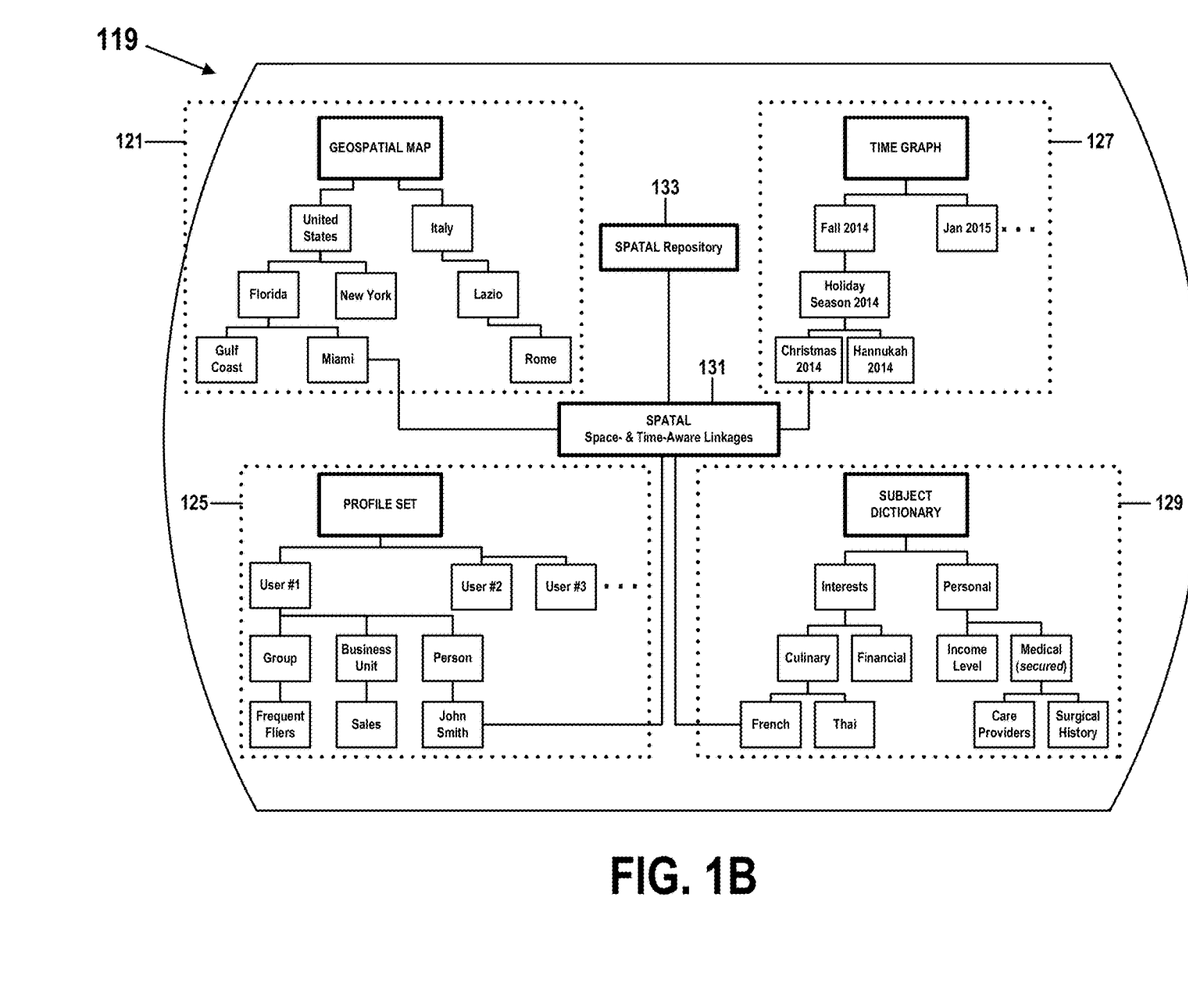
FIG. 1B shows an example of the multidimensional information repository 119 in greater detail.

An example of a multidimensional information repository 119 is shown in greater detail in FIG. 1B.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for a multidimensional information repository for managing dynamic time-sensitive and space-sensitive user characteristics in accordance with embodiments of the present invention, and may implement other embodiments described in this specification, including the methods illustrated in FIGS. 1-3. The data-storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for a multidimensional information repository for managing dynamic time-sensitive and space-sensitive user characteristics.

Any of the components of the present invention could be created, integrated, hosted, maintained, deployed, managed, serviced, supported, etc. by a service provider who offers to facilitate a method for a multidimensional information repository for managing dynamic time-sensitive and space-sensitive user characteristics. Thus the present invention discloses a process for deploying or integrating computing infrastructure, comprising integrating computer-readable code into the computer system 101, wherein the code in combination with the computer system 101 is capable of performing a method for a multidimensional information repository for managing dynamic time-sensitive and space-sensitive user characteristics.

One or more data storage units 111 (or one or more additional memory devices not shown in FIG. 1A) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

While it is understood that program code 107 for cross-retail marketing based on analytics of multichannel clickstream data may be deployed by manually loading the program code 107 directly into client, server, and proxy computers (not shown) by loading the program code 107 into a computer-readable storage medium (e.g., computer data-storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for cross-retail marketing based on analytics of multichannel clickstream data is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

FIG. 1B shows an example of the multidimensional information repository 119 in greater detail. FIG. 1B refers to objects 119-133.

In this example, the information repository comprises four linked areas 121-129 of data storage. The internal structure shown here may vary considerably, based on considerations that may include, but are not limited to: characteristics of the stored date or of entities represented by the stored data; goals of the system designer or of the owner of the stored data; technical or resource constraints. In some embodiments, for example, the stored data may be further organized into subschema other than the subschema 121-129 shown here. In other cases, there may be additional or different linkages among the subschema, or the subschema may organize tables or records in a manner different than the hierarchical treelike structures shown here.

The examples of FIG. 1B show the information repository 119 implemented as a relational database but the repository 119 and any of its components 121-133 may be implemented by any mechanism known to those skilled in the art capable of supporting features of the present invention described herein. Such a mechanism might comprise, but is not limited to, combinations of a knowledgebase, other types of databases, a flat-file system, a directed graph, or free-form text from which relationships among text objects may be inferred.

Regardless of the implementation details, a repository 119 must at least organize data in a way that allows a profile record to be linked to records that identify space, time, and subject context for that record.

In FIG. 1B, Profile sub-schema 125 represents an example of an organization of profile records. Each record may, for example, represent an account or an individual user. Here, for example, the profile set 125 contains a set of user records, each of which identifies a distinct account.

Each user record is further associated with other records that each identify a characteristic of the user record. User #1, for example, is associated with a group, a business unit, and an individual person. Here, User #1 is associated with a group of frequent fliers, a Sales Department business unit, and an individual named John Smith. Other profile records, such as those shown for User #2 and User #3

This example should not be construed to limit the organization structure of a profile set 125. Additional levels of records might, for example, identify an airline associated with User #1's frequent-flier group or a subdivision of the Sales Department that is associated with User #1.

Sub-schema 121 shows an example of a Geospatial Map stored in repository 119. In this example, each record of the Geospatial Map 121 is associated with a geographical location, a physical site, a node of a network, or an other entity that may be associated with a virtual or physical position in space.

In the example of FIG. 1B, two records of Geospatial Map 121 identify geophysical locations "United States" and "Italy." A location identified by each of these records may, in this hierarchical example, be associated with, or linked to, other records that identify a second, broader or narrower, geospatial entity. The "United States" record, for example, may be linked to fifty records each identify one state of the United States, such as the "New York" record shown in FIG. 1B.

Similarly, a Time Graph sub-schema 127 may organize time-related data elements into a data structure. In this example, a top level of records each identifies a month of a year or a season and lower levels of records may narrow or broaden a period of time identified by a top level record.

Top-level record "Fall 2014," for example, identifies a period of time that comprises "Holiday Season 2014" (identified by a record at the next-lower second level), which in turn identifies a period of time that comprises both "Christmas 2014" and "Hannukah 2014" (each identified by records at a third level). Many other structures and organizations are possible, which may or may not be hierarchical.

A Subject Dictionary sub-schema 129 similarly organizes types of subject matter that may be associated with one or more profiles. Many types of organization and data structures are possible, depending on implementation details, and in this example, the Subject Dictionary 129 contains two classes of subjects "Interests" and "Personal." Here, the "Interests" record may in turn identify many types of personal interests that may be linked to an individual identified by a record of the Profile Set 125.

Each profile identified by a record of the Profile Set 125 may be linked to one or more records of the Geospatial Map 121, to one or more records of the Time Graph 127, or to one or more records of the Subject Dictionary 129. These linkages 131 establish time-sensitive or space-sensitive context to the Profile record's relationship with a subject identified by a Subject Dictionary 129 record that is further linked to the Profile record.

Embodiments of the present invention automatically establish, update, and maintain these "SPATAL" space and time sensitive linkages 131 while dynamically updating the four databases 121-129. In some embodiments, SPATAL linkages may be stored and dynamically updated in a distinct storage area 133 called the SPATAL Repository. In other embodiments, some or all of the SPATAL linkages may reside in an other data repository or may be maintained automatically by a database-management system or other data-management platform that is associated with maintaining repository 119.

Figure 2:
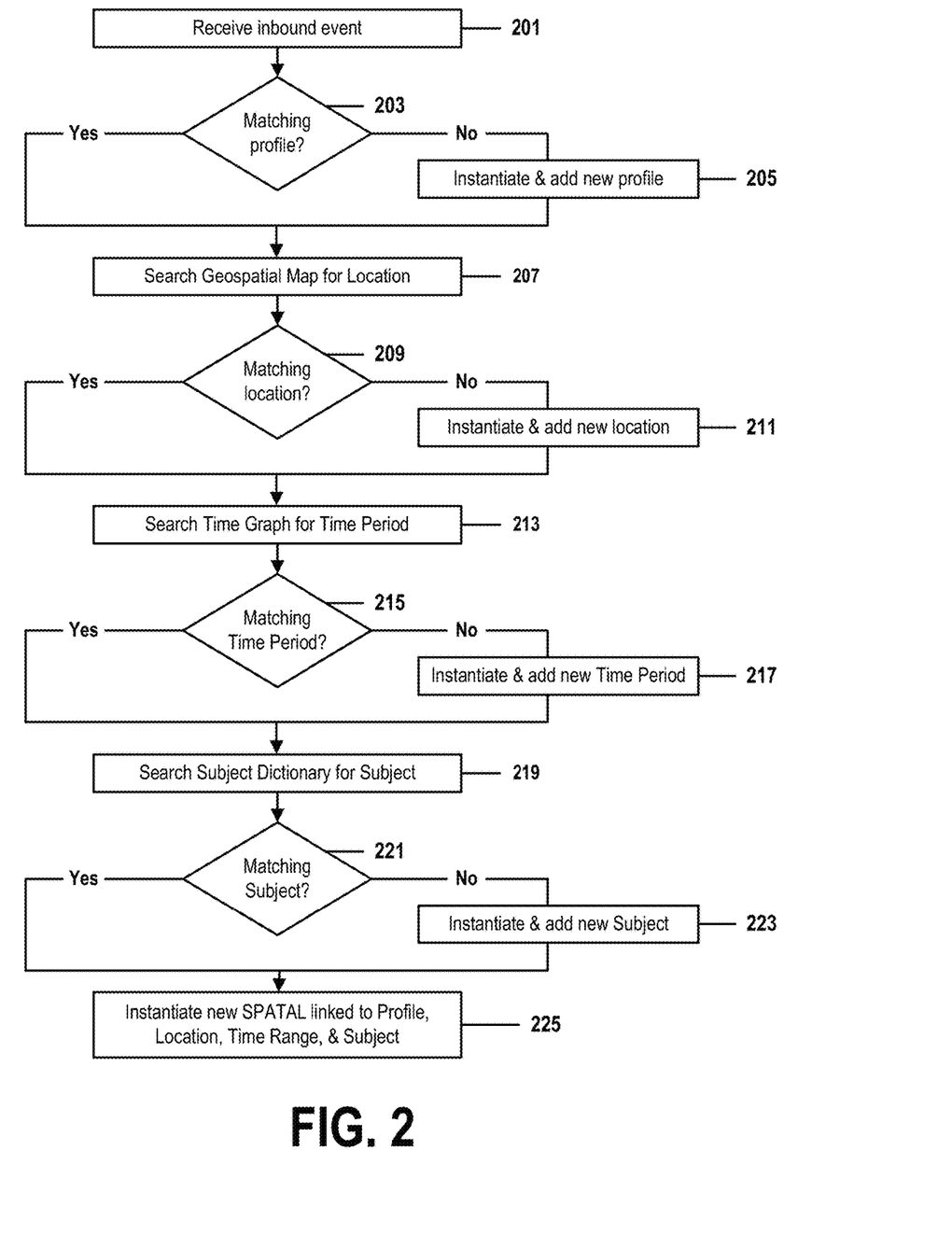
FIG. 2 is a flow chart that illustrates a method of a profile-management system for aggregating and storing time- and space-sensitive profiles in accordance with embodiments of the present invention.

FIG. 2 is a flow chart that illustrates a method of a profile-management system for aggregating and storing time- and space-sensitive profiles in accordance with embodiments of the present invention. FIG. 2 identifies steps 201-225.

The method of FIG. 2 presumes that the profile-management system accesses and maintains data and logic stored in a multidimensional information repository 119, like the one shown in FIG. 1B, and is implemented on a specialized computer/infrastructure/storage platform, similar to the exemplary system 101-115 of FIG. 1A.

The profile-management system intercepts a user request to access data stored in a main storage platform (such as a combination of one or more database or one or more other types of information repositories known to those skilled in the art), and in response returns a modified query that accounts for time-sensitive and space-sensitive characteristics of the requested data. This main storage platform is not shown in the figures and may comprise any combination of information-storage mechanisms known to those skilled in the art.

The requested data may be a set of user profile records that are each associated with one or more time- or space-sensitive characteristics that may in turn vary as a function of a relationship between a profile record and a type of subject matter. An example of this retrieval mechanism is described in FIG. 3.

In some embodiments, the main storage platform may be integrated with multidimensional repository 119, or both a main storage platform and a multidimensional repository 119 may be implemented on a common platform.

In step 201, the profile-management system receives an inbound event. In some embodiments, this event may be a result of a user's transaction request, query, record-addition, record-deletion, key or linkage modification, or other instruction that requires accessing, adding, modifying, or deleting a profile or other record in Profile Set 125.

In some cases, as in the example of FIG. 2, an inbound event may, instead of expressly requesting a data retrieval, describe characteristics of an event from which may be inferred one or more linkages between one or more profile records, stored in Profile Set 125, and one or more classes of subject matter, time periods, and geospatial locations. These linkages may create time-sensitive and space-sensitive context for relationships between linked profile records and certain types of subject matter.

For example, if a hurricane strikes a major city during a particular time period, an inbound event that describes an effect of that storm, may, by means of the method of FIG. 2, result in the creation or revision of records stored in subsets 121-129 of information repository 119, and of the creation or revision of linkages stored in SPATAL Repository 133. A goal of this creation or revision would be to associate certain user profiles with a subject of storm-related insurance claims, when those profiles are accessed within the time- and space-sensitive context of the date and location of the hurricane.

In step 203, the profile-management system determines, by means known to those skilled in the art, whether the profile referenced by the inbound event in step 201 already exists in the multidimensional information repository 119. If the record does exist, the method of FIG. 2 continues with step 207. If the record does not exist, the method of FIG. 2 performs step 205 before continuing to step 207.

In step 205, the profile-management creates and adds to Profile Set 205 the record referenced by the inbound event in step 201. In some embodiments, linkages (or space- and time-sensitive SPATAL linkages) to other records in the repository 119 may be created and associated with this new record based on other information available to the profile-management system.

In some embodiments, the inbound event may reference more than one user, user profile, or other record associated with the Profile Set 205. In such cases, the profile-management system might repeat the remainder of the method of FIG. 2 for each such record.

In step 207, the profile-management system identifies a geospatial location associated with the profile record identified by the inbound event. This association may be known to the system as a function of an express or implicit reference embodied in the inbound event, by an existing SPATAL linkage 131, which in some embodiments may be stored in a SPATAL repository 133, by a linkage known to be associated with a record identified by the profile-management system as existing the Profile Set 205 in step 203 or created in step 205, or by other means known to those skilled in the art.

In step 209, the profile-management system determines whether the geospatial location referenced by the inbound event is already identified in the multidimensional information repository 119 by searching Geospatial Map 121 for a record that identifies the referenced geospatial location. If the record does exist, the method of FIG. 2 continues with step 213. If no such record exists, the method of FIG. 2 performs step 211 before continuing to step 213.

In step 211, the profile-management creates and adds to Profile Set 205 a record that identifies the time period referenced by the inbound event in step 201. In some embodiments, linkages (or space- and time-sensitive SPATAL linkages) to other records in the repository 119 may be created and associated with this new record based on other information available to the profile-management system.

In some embodiments, the inbound event or the user profile record associated with the inbound event, may reference more than one time period, each of which may in turn be associated with a distinct record in the Geospatial Map 121.

In step 213, the profile-management system identifies a time period associated with the profile record identified by the inbound event. This association may be known to the system as a function of an express or implicit reference embodied in the inbound event, by an existing SPATAL linkage 131, which in some embodiments may be stored in a SPATAL repository 133, by a linkage known to be associated with a record identified by the profile-management system as existing the Profile Set 205 in step 203 or created in step 205, or by other means known to those skilled in the art.

In step 215, the profile-management system determines whether the time period referenced by the inbound event is already identified in the multidimensional information repository 119 by searching Time Graph 127 for a record that identifies the referenced time period. If the record does exist, the method of FIG. 2 continues with step 219. If no such record exists, the method of FIG. 2 performs step 217 before proceeding to step 219.

In one example, a business might perform an SQL query on a relational database in order to retrieve a set of user profiles that identify users to whom will be mailed marketing literature. A traditional database is able to retrieve such user profiles, but cannot interpret inferred or implied time-sensitive and location-sensitive nuances of such a query in order to return more narrowly targeted results.

In this example, the query would be intercepted by an embodiment of the present invention implemented as a function of a special-purpose "multidimensional" information repository, wherein the "multidimensional" aspect of the repository derives from the fact that the repository dynamically links elements based on an inferred or express time and location of an inbound event or query.

Here, the repository may use a time and location at which the query was created and use this information to traverse time-sensitive and location-sensitive linkages that are specific to the combination of query time and location. These linkages may in turn affect the embodiment's identification of a subject matter of the query or of user profiles to be retrieved by the query.

For example, if the query originated in mid-December from a region of the world where a Christmas holiday is generally celebrated on December 25, the embodiment might identify a linkage to a "Christmas gift marketing literature" subject and would return either a subset of user profiles that are linked to this subject, or return a modified query to the main database, where that modified query contains an additional search term that identifies the Christmas season.

On the other hand, if the query originates during the summer months or from a country in which Christmas is not generally celebrated, a different set of linkages might, as a function of the time and location of the query, identify a different subject, such as "summer-vacation marketing literature" or a different set of user profiles that have linkages to summer-oriented subject matter. Many other such variations are possible.

Unlike conventional database solutions, the time- and location-sensitive linkages (or "SPATALs") that enable this functionality are maintained automatically or dynamically by the embodiment. In other words, a multidimensional repository 119 may automatically and dynamically revise its own schema (or other type of data organization) in response to identification of external conditions or occurrences.

If any inbound event implies a condition or occurrence that modifies such a linkage (such as a user moving from a region where Christmas is generally observed to a region where it is not generally observed), the linkages 131 stored in SPATAL repository 133 are automatically updated by a method similar to that of FIG. 2.

Furthermore, unlike conventional databases solutions, an implied or inferred time-sensitive or location-sensitive context of a query or other database operation may be automatically incorporated into a requested database operation, even if the query or other operation does not contain any time-sensitive or location-sensitive content. In other words, two instances of an identical query, if processed by an embodiment of this invention, may produce different results if they are received at different times or from different locations—even if a schema and stored data of the multidimensional repository 119 do not change between receipts of the two queries.

In some embodiments, a map-like or other visual type of graphical user interface may be imposed upon the multidimensional repository 119 that allows a user to further update or fine-tune data or linkages comprised by the repository 119. This feature may provide a technical advantage when an extrinsic event that may affect time- or location-sensitivity of stored data items is not inferred from an automatically received inbound event or condition. This feature may, in some embodiments, also allow users to manually retrieve data (or modify an existing query or other database operation) as a function of user-supplied boundary conditions, time-sensitive or location-sensitive context, or express search criteria.

In some embodiments, linkages or other relationships, or other characteristics of a user profile may also vary as a function of time or location. A user's age, for example, may over time dynamically or automatically alter linkages associated with that user's profile. In one example, if a query attempts to identify users likely to respond to a restaurant-marketing campaign, a teenaged user may initially be more closely linked to fast-food restaurant chains, but that same user may, over the years, become associated with linkages that more closely relate that user's profile to more upscale restaurants.

Figure 3:
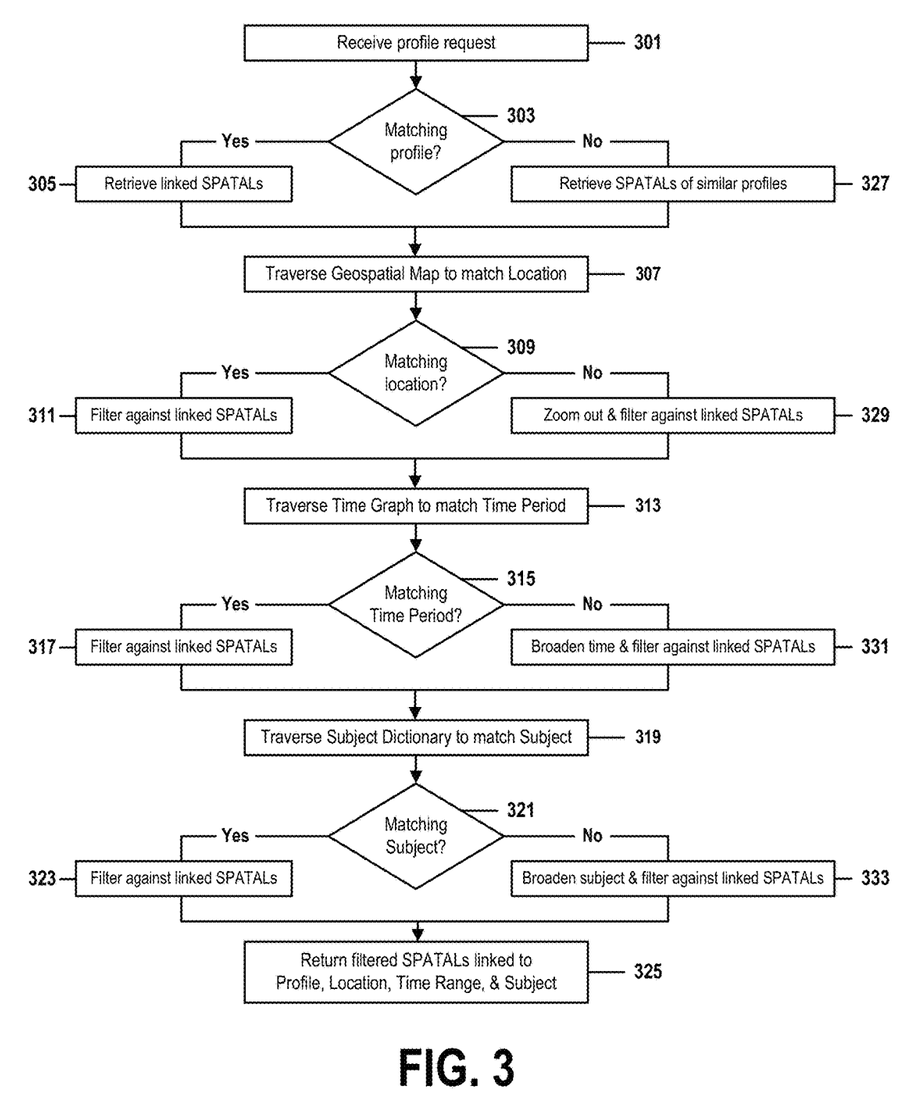
FIG. 3 is a flow chart that illustrates a method of a profile-management system for retrieving time-sensitive and space-sensitive data from a multidimensional information repository in accordance with embodiments of the present invention.

As shown in FIGS. 2 and 3, embodiments of the present invention may associate a confidence level with the results that the embodiment produces by choosing "next best" linkages when the embodiment cannot find an exact match among existing linkages of the repository 119. In such cases, the embodiment might move up a time or location hierarchy of the repository 119, starting from a location in the hierarchy where an exact match had been expected. In one example, consider a query that requests profiles of users who regularly order pizza during the winter months in the New York City borough of Brooklyn. If no such location-sensitive linkages are found, the embodiment might zoom out one level in the location hierarchy (or "geospatial map") 125 of repository 119 and return profiles of users who regularly order pizza during the winter months in any borough of New York City. Such a retrieval could then be automatically associated by the embodiment with a lower confidence level than would an exact match for Brooklyn users.

In step 217, the profile-management creates and adds to Time Graph 127 a record that identifies the time period referenced by the inbound event in step 201. In some embodiments, linkages (or space- and time-sensitive SPATAL linkages) to other records in the repository 119 may be created and associated with this new record based on other information available to the profile-management system.

In some embodiments, the inbound event or the user profile record associated with the inbound event, may reference more than one time period, each of which may in turn be associated with a distinct record stored in the Time Graph 127.

In step 219, the profile-management system identifies a subject matter associated with the profile record identified by the inbound event. This association may be known to the system as a function of an express or implicit reference embodied in the inbound event, by an existing SPATAL linkage 131, which in some embodiments may be stored in a SPATAL repository 133, by a linkage known to be associated with a record identified by the profile-management system as existing the Profile Set 205 in step 203 or created in step 205, or by other means known to those skilled in the art.

In step 221, the profile-management system determines whether the subject matter referenced by the inbound event is already identified in the multidimensional information repository 119 by searching Subject Dictionary 129 for a record that identifies the referenced subject matter. If the record does exist, the method of FIG. 2 continues with step 225. If no such record exists, the method of FIG. 2 performs step 223 before proceeding to step 225.

In step 223, the profile-management creates and adds to Subject Dictionary 129 a record that identifies the subject matter referenced by the inbound event in step 201. In some embodiments, linkages (or space- and time-sensitive SPATAL linkages) to other records in the repository 119 may be created and associated with this new record based on other information available to the profile-management system.

In some embodiments, the inbound event or the user profile record associated with the inbound event, may reference more than one subject matter, each of which may in turn be associated with a distinct record stored in the Subject Dictionary 129.

The steps of the method of FIG. 2 may in some embodiments be performed in different order. For example, the profile-management system may search the Geospatial Map 121 for a referenced location record only after first searching the Time Graph 127 for a referenced time-period record or searching the Subject Dictionary 129 for a subject-matter record.

During the course of the method of FIG. 2, the profile-management system may automatically create linkages between profile records found in or added to Profile Set 125 in step 203 or 205 and records found in or added to the Geospatial Map 121 in step 209 or 211, the Time Graph 127 in step 215 or 217, or the Subject Dictionary 129 in step 221 or 223.

FIG. 3 is a flow chart that illustrates a method of a profile-management system for retrieving time-sensitive and space-sensitive data from a multidimensional information repository in accordance with embodiments of the present invention. FIG. 3 identifies steps 301-333.

The method of FIG. 3 presumes that a multidimensional information repository 119 has been populated and is being maintained by a profile-management system that accesses and updates data and logic stored in the repository by means of a method similar to that of FIG. 2.

In step 301, the profile-management system receives a profile request. This request may be any transaction, query, record-addition, record-deletion, key or linkage modification, or other instruction that requires accessing, adding, modifying, or deleting a profile or other record of the main database.

In step 303, the profile-management system determines, by means known to those skilled in the art, whether the user record (or records) requested by the profile request in step 301 already exists in Profile Set 125 of multidimensional information repository 119.

If the record does exist, the method of FIG. 3 continues with step 305. Otherwise, the method of FIG. 3 instead performs step 327.

In step 305, performed if the requested records do exist, the profile-management system retrieves time-sensitive and space-sensitive linkages (or SPATALs) associated with each requested record. These linkages provide time-sensitive and space-sensitive context to the profile request as a function of subject matter related to the request.

In step 327, the profile-management system identifies existing records stored in Profile Set 125 that are similar to each nonexistent record referenced by the profile request. It then retrieves SPATALs of these similar records.

Some embodiments further assign a confidence level to results produced by the method of FIG. 3. These confidence levels may provide a measure of how well a retrieved set of records satisfies express or implied conditions or search terms comprised by the profile request. A higher confidence level might, for example, indicate that a greater number of the retrieved records are associated with an exact match of one or more search terms of the profile request.

In step 305, for example, the profile-management system's ability to locate and retrieve one or more requested records might result in an increase in a value of a confidence level associated with the retrieved records. But if those records cannot be identified, forcing step 327 to be performed instead of step 305, the retrieval of records that are not exact matches for criteria expressly or implicitly associated with the request would cause the embodiment to decrease the confidence level of the retrieved result.

As will be described below, in such embodiments, a successful identification of a record that is associated with a value that exactly matches a desired value of a parameter of the request may increase a value of a confidence level associated with the retrieved result set. Furthermore, if such an embodiment is forced to retrieve a record that is merely similar to a nonexistent record that would have been an exact match may cause the embodiment to decrease the confidence level of the retrieved result set.

In some embodiments, a retrieved result set may be associated with several distinct confidence levels, each of which identifies a quality, accuracy, reliability, timeliness, or reliability of one characteristic of the result set. Here, a characteristic might be a combination of a time context, a location context, a specific subject or class of subject matter, or an other attribute of one or more records of the retrieved results.

This dynamic computation of confidence levels may provide technical advantages that include: better identifying a need to fine-tune or update elements of the information repository 119; allowing users or system administrators to more precisely determine whether the result set is appropriate for specific types of applications; and earmarking records that should be more closely examined or that should be considered for deletion or updating.

This identification of similar records may be performed by any means known to those skilled in the art. For example, if Profile Set 125 is organized hierarchically, the system may identify a position in the hierarchy that would be occupied by the referenced record, if it had existed, and may identify a record that would be its parent as being "similar." In some embodiments, the system might further identify any sibling records of that parent record as being "similar" to the referenced record. The exact method of identifying similar records may be a function of implementation-specific details, such as resource or platform constraints, a financial or business goal of the implementation, or a characteristic of the entities described by the Profile Set 125.

In step 307, the profile-management system searches Geospatial Map 121 for records that identify one or more geospatial locations identified by the profile request in step 301. Each of these records, as described in FIG. 2, may be associated with certain profiles stored in Profile Set 125, and each is associated with "SPATAL" time-sensitive and space-sensitive linkages. If, for example, the profile request results in the selection of ten user-profile records and is implicitly associated with New York State, the profile-management system may n step 307 search for a record of the Geospatial Map 121 that identifies a location of "New York State" or may determine whether any of those ten records are linked by a SPATAL to a record of the Geospatial Map 121 that identifies a location of "New York State."

In step 309, the profile-management system determines whether a record of the Geospatial Map 121 provides an exact match for a geospatial location specified by the profile request in step 301. If so, the method of FIG. 3 continues with step 311, and if not, the method continues instead with step 329.

As in steps 303, 305, and 327 above, embodiments of the profile-management system that characterize a quality of a result set by associating one or more retrieved records of the result set with one or more confidence levels, may adjust one or more of these confidence levels as a function of a determination of step 309.

In particular, the profile-management system may increase a value of a confidence level if it determines in step 309 that a record of the Geospatial Map 121 provides an exact match for a geospatial location specified by the profile request in step 301. And the profile-management system may decrease a value of a confidence level if it determines in step 309 that no record of the Geospatial Map 121 provides an exact match for the geospatial location specified by the profile request.

In step 311, the profile-management system uses SPA-TALs associated with the Geospatial Map record found in step 307 to filter the set of profile records requested by the profile request in step 301. If, for example, the profile request searches for users whose billing method specifies lire as a primary currency, the profile-management system might, in this step, identify an "Italy" record of the Geospatial Map 121 and then filter the set of requested references such that the resulting subset contains only profile records that have a linkage to the "Italy" record.

In step 329, the profile-management system identifies records of the Geospatial Map 121 that identify locations similar to the location identified by the profile request. As in step 327, which identified profile records similar to profile records identified by the profile request, identification of similar records may be performed by methods known to those skilled in the art. As before, such a known method might comprise selecting location records stored at one level higher in a Geospatial Map hierarchy than the level at which one would have expected to find the nonexistent requested location record.

Regardless of whether location records are selected by means of step 311 or step 329, the profile-management system at the conclusion of the conditional operation of steps 309, 311 will have identified a set of space-sensitive linkages associated with the selected location records. These linkages, as described above, are then used to filter the set of selected user profiles.

Procedures analogous to the method of steps 307, 309, 311, and 329 are performed first for space-sensitive linkages in steps 313, 315, 317, and 331, and again for subject-matter linkages in steps 319, 321, 323, and 333.

In step 313, for example, the profile-management system searches for a record of the Time Graph 127 that provides an exact match for a time duration specified by the profile request in step 301.

In step 315, if the system has successfully located one or more such records, the method of FIG. 3 continues with step 317. If not, the method continues instead with step 331.

As in steps 303 and 309 above, embodiments of the profile-management system that characterize a quality of a result set by associating one or more retrieved records of the result set with one or more confidence levels, may adjust one or more of these confidence levels as a function of a determination of step 315.

In particular, the profile-management system may increase a value of a confidence level if it determines in step 315 that a record of the Time Graph 127 provides an exact match for a time period specified by the profile request in step 301. And the profile-management system may decrease a value of a confidence level if it determines in step 315 that no record of the Time Graph 127 provides an exact match for the time period specified by the profile request.

In step 317, the profile-management system uses SPA-TALs associated with the Time Graph record found in step 315 to filter the set of profile records requested by the profile request in step 301. If, for example, the profile request searches for users who made purchases during January 2015, the profile-management system might, in this step, identify a "January 2015" record of the Time Graph 127 and then filter the set of requested references (already filtered in step 311 or 329 to account for space-sensitive context) such that the resulting subset contains only records of the Profile Set 125 that have a SPATAL linkage to the "January 2015" record of the Time Graph 127.

In step 331, the profile-management system identifies records of the Time Graph 127 that identify time periods similar to the time period identified by the profile request. Here, identification of similar time-period records may be performed by methods known to those skilled in the art and analogous to those performed by steps 327 and 329.

Regardless of whether time-period records are selected by means of step 317 or step 331, the profile-management system at the conclusion of the conditional operation of steps 311, 317, and 331 will have identified a set of time-sensitive linkages associated with the selected location records. These linkages, as described above, are then used to further filter the set of selected user profiles, such that the resulting subset comprises only profile records associated with specific time-sensitive and space-sensitive characteristics associated with or inferred from the profile request and identified by SPATALs of the multidimensional database 119.

Finally, in steps 321, 323, and 333, the profile-management system performs a similar procedure for subject-matter linkages that it stores and maintains in the SPATAL repository 133.

In step 321, the profile-management system searches for a record of the Subject Dictionary 129 that exactly matches a subject identified by or inferred from the profile request received in step 301. If the system locates one or more such records, the method of FIG. 3 continues with step 323, and if not, the method continues instead with step 333.

As in steps 303, 309, and 315 above, embodiments of the profile-management system that characterize a quality of a result set by associating one or more retrieved records of the result set with one or more confidence levels, may adjust one or more of these confidence levels as a function of a determination of step 321.

In particular, the profile-management system may increase a value of a confidence level if it determines in step 321 that a record of the Subject Dictionary 129 provides an exact match for a subject matter specified by the profile request in step 301. And the profile-management system may decrease a value of a confidence level if it determines in step 321 that no record of the Subject Dictionary 129 provides an exact match for the subject matter specified by the profile request.

In step 323, the profile-management system uses SPA-TALs associated with the subject-matter record identified in step 321 to filter the set of profile records requested by the profile request in step 301. If, for example, the profile requests users who frequently dine at French restaurants, the profile-management system might, in this step, identify a "Culinary/French" record of the Subject Dictionary 129 and then filter the current subset of requested references to retain only records of the Profile Set 125 that comprise a SPATAL linkage to the "Culinary/French" record of the Subject Dictionary 129.

In step 333, the profile-management system instead identify records of the Subject Dictionary 129 that identify subject matter similar to the subject of the profile request. Here, identification of similar subject-matter records may be performed by methods known to those skilled in the art and analogous to those performed by steps 327, 329, and 331.

At the outset of step 325, the profile-management system will have identified a set of time-sensitive and space-sensitive linkages in response to the profile request received in step 301. In some embodiments, the system will augment the original profile request with these linkages when forwarding the request to the main database system. This procedure will, in effect, automatically narrow the resulting query by adding time-sensitive, space-sensitive, and subject-matter terms to the query.

In other embodiments, the profile-management system may perform a preliminary portion of the final query by using SPATAL linkages stored in the multidimensional repository to filter out a subset of possible query results before the query is received by the main database. In some embodiments, these two operations may be equivalent, but in all cases, the operation of this intermediate profile-management system will reduce the demands on the main database by preprocessing the profile request.

The system will also increase the confidence factor of query results by adding time-sensitive and space-sensitive context to a query, even if the main database is not organized to take such factors into account.

In one example, a user of an insurance company's main database may request a list of policyholders who listed a primary residence in northwest Florida during January, 2015, when a hurricane hit the Gulf Coast of Florida. This query may further request dollar amounts of insurance claims made by such residents during that time.

A traditional database application might, in response, search millions of records in the main database in order to identify a few hundred qualifying policyholders. But here, the method of FIG. 2 would intercept the search request before it resulted in a query to the main database and would identify only current policyholder records in Profile Set 125 that comprise SPATAL linkages to: a "United States/Florida/Gulf Coast" record of Geospatial Map 121; the "January 2015" record of Time Graph 127, and an "Insurance Claim" record of Subject Dictionary 129.

The profile-management system would then either return the records that conform to those linkages or, if the main database supported such an operation, narrow the query to search only for entities identified by the three linked records.

What is claimed is:

1. A profile-management system comprising a computer processor, a memory coupled to the processor, a computer-readable hardware storage device coupled to the processor, and a multidimensional information repository that comprises a profile set of user-profile records that each identifies a user profile of a plurality of user profiles, a geospatial-map set of location records that each identifies a location of a plurality of locations, a time-graph set of time-period records that each identifies a time period of a plurality of time periods, and a subject-dictionary set of subject-matter records that each identifies a subject of a plurality of subjects, wherein the storage device stores program code configured to be run by said processor via the memory to implement a method for managing dynamic time-sensitive and space-sensitive user characteristics, the method comprising:

the system receiving an inbound event that is associated with a first user profile, a first location, a first time period, and a first subject;

the system searching the profile set for a user-profile record associated with the first user profile and adding such a record to the profile set if none already exists;

the system decreasing a first confidence level of the record if unable to identify the record in the profile set that exactly matches the first user profile associated with the inbound event;

the system searching the geospatial map for a location record associated with the first location and adding such a record to the geospatial map if none already exists;

the system zooming out the geospatial map and decreasing a second confidence level of the location record if unable to identify the location record that exactly matches the first location associated with the inbound event;

the system searching the time graph for a time-period record associated with the first time period and adding such a record to the time graph if none already exists;

the system searching the subject dictionary for a subject-matter record associated with the first subject and adding such a record to the subject dictionary if none already exists;

the system creating a set of space-sensitive and time-sensitive linkages, wherein the linkages link the record associated with the first user profile to the record associated with the first location, the record associated with the first time period, and the record associated with the first subject;

the system continuously self-learning by recognizing the set of space-sensitive and time-sensitive linkages in user behaviors represented by objects and the linkages and using self-learned observations to infer user behavioral patterns in the user-profile records;

the system dynamically and automatically updates the set of space-sensitive and time-sensitive linkages in response to a modification of the inbound event; and the system increasing a confidence factor of query results by adding space-sensitive context and time-sensitive context to a query.

2. The system of claim 1, wherein the method further comprises:

the system automatically updating the set of space-sensitive and time-sensitive linkages in response to a change in a characteristic of the first user profile.

3. The system of claim 1, wherein one or more of the set of space-sensitive and time-sensitive linkages are inferred from a time at which the system receives the inbound event and a location from which the inbound event was sent.

4. The system of claim 1, wherein the method further comprises:

the system receiving a profile request that identifies a requested user profile of the plurality of user profiles; and the system selecting from the profile set a second user-profile record that is associated with the requested user profile, wherein a second space linkage links the second user-profile record to a second location, a second time linkage links the second user-profile record to a second time period, and a second subject linkage links the second user-profile record to a second subject.

5. The system of claim 4, wherein the method further comprises:
   the system selecting from the geospatial map a second location record that is associated with the second location;
   the system selecting from the time graph a second time-period record that is associated with the second time period; and
   the system selecting from the subject dictionary a second subject-matter record that is associated with the second subject.

6. The system of claim 5,
   wherein the system selects the second user-profile record by first attempting to select a record in the profile set that exactly matches the requested user profile and, if unable to identify such a record, instead selecting a record in the profile set that most closely matches the requested user profile,
   wherein the system selects the second location record by first attempting to select a record in the geospatial map that exactly matches the second location and, if unable to identify such a record, instead selecting a record in the geospatial map that most closely matches the second location,
   wherein the system selects the second time-period record by first attempting to select a record in the time graph that exactly matches the second time period and, if unable to identify such a record, instead selecting a record in the time graph that most closely matches the second time period, and
   wherein the system selects the second subject-matter record by first attempting to select a record in the subject dictionary that exactly matches the second subject and, if unable to identify such a record, instead selecting a record in the subject dictionary that most closely matches the second subject.

7. The system of claim 6, wherein the method further comprises:
   the system increases a value of a third confidence level if able to identify in the profile set a record that exactly matches the requested user profile and decreases the value of the third confidence level if unable to identify a record in the profile set that exactly matches the requested user profile,
   the system increases a value of a fourth confidence level if able to identify in the geospatial map a record that exactly matches the second location and decreases the value of the fourth confidence level if unable to identify a record in the geospatial map that exactly matches the second location,
   the system increases a value of a fifth confidence level if able to identify in the time graph a record that exactly matches the second time period and decreases the value of the fifth confidence level if unable to identify a record in the time graph that exactly matches the second time period, and
   the system increases a value of a sixth confidence level if able to identify in the subject dictionary a record that exactly matches the second subject and decreases the value of the sixth confidence level if unable to identify a record in the subject dictionary that exactly matches the second subject.

8. A method for maintaining a multidimensional information repository for managing dynamic time-sensitive and space-sensitive user characteristics, wherein the multidimensional information repository comprises a profile set of user-profile records that each identifies a user profile of a plurality of user profiles, a geospatial-map set of location records that each identifies a location of a plurality of locations, a time-graph set of time-period records that each identifies a time period of a plurality of time periods, and a subject-dictionary set of subject-matter records that each identifies a subject of a plurality of subjects, the method comprising:
   a profile-management system receiving an inbound event that is associated with a first user profile, a first location, a first time period, and a first subject;
   the system searching the profile set for a user-profile record associated with the first user profile and adding such a record to the profile set if none already exists;
   the system decreasing a first confidence level of the record if unable to identify the record in the profile set that exactly matches the first user profile associated with the inbound event;
   the system searching the geospatial map for a location record associated with the first location and adding such a record to the geospatial map if none already exists;
   the system zooming out the geospatial map and decreasing a second confidence level of the location record if unable to identify the location record that exactly matches the first location associated with the inbound event;
   the system searching the time graph for a time-period record associated with the first time period and adding such a record to the time graph if none already exists;
   the system searching the subject dictionary for a subject-matter record associated with the first subject and adding such a record to the subject dictionary if none already exists;
   the system creating a set of space-sensitive and time-sensitive linkages, wherein the linkages link the record associated with the first user profile to the record associated with the first location, the record associated with the first time period, and the record associated with the first subject;
   the system continuously self-learning by recognizing the set of space-sensitive and time-sensitive linkages in user behaviors represented by objects and the linkages and using self-learned observations to infer user behavioral patterns in the user-profile records;
   the system dynamically and automatically updates the set of space-sensitive and time-sensitive linkages in response to a modification of the inbound event; and
   the system increasing a confidence factor of query results by adding space-sensitive context and time-sensitive context to a query.

9. The method of claim 8, wherein the method further comprises:
   the system automatically updating the set of space-sensitive and time-sensitive linkages in response to a change in a characteristic of the first user profile.

10. The method of claim 8, wherein one or more of the set of space-sensitive and time-sensitive linkages are inferred from a time at which the system receives the inbound event and a location from which the inbound event was sent.

11. The method of claim 8, wherein the method further comprises:
   the system receiving a profile request that identifies a requested user profile of the plurality of user profiles; and
   the system selecting from the profile set a second user-profile record that is associated with the requested user profile, wherein a second space linkage links the second user-profile record to a second location, a second time linkage links the second user-profile record to a second time period, and a second subject linkage links the second user-profile record to a second subject.

12. The method of claim 11, wherein the method further comprises:
the system selecting from the geospatial map a second location record that is associated with the second location;
the system selecting from the time graph a second time-period record that is associated with the second time period; and
the system selecting from the subject dictionary a second subject-matter record that is associated with the second subject.

13. The method of claim 12,
wherein the system selects the second user-profile record by first attempting to select a record in the profile set that exactly matches the requested user profile and, if unable to identify such a record, instead selecting a record in the profile set that most closely matches the requested user profile,
wherein the system selects the second location record by first attempting to select a record in the geospatial map that exactly matches the second location and, if unable to identify such a record, instead selecting a record in the geospatial map that most closely matches the second location,
wherein the system selects the second time-period record by first attempting to select a record in the time graph that exactly matches the second time period and, if unable to identify such a record, instead selecting a record in the time graph that most closely matches the second time period, and
wherein the system selects the second subject-matter record by first attempting to select a record in the subject dictionary that exactly matches the second subject and, if unable to identify such a record, instead selecting a record in the subject dictionary that most closely matches the second subject.

14. The method of claim 13,
the system increases a value of a third confidence level if able to identify in the profile set a record that exactly matches the requested user profile and decreases the value of the third confidence level if unable to identify a record in the profile set that exactly matches the requested user profile,
the system increases a value of a fourth confidence level if able to identify in the geospatial map a record that exactly matches the second location and decreases the value of the fourth confidence level if unable to identify a record in the geospatial map that exactly matches the second location,
the system increases a value of a fifth confidence level if able to identify in the time graph a record that exactly matches the second time period and decreases the value of the fifth confidence level if unable to identify a record in the time graph that exactly matches the second time period, and
the system increases a value of a sixth confidence level if able to identify in the subject dictionary a record that exactly matches the second subject and decreases the value of the sixth confidence level if unable to identify a record in the subject dictionary that exactly matches the second subject.

15. The method of claim 8, further comprising providing at least one support service for at least one of creating, integrating, hosting, maintaining, and deploying computer-readable program code in the computer system, wherein the computer-readable program code in combination with the computer system is configured to implement the receiving, the searching the profile set, the searching the geospatial map, the searching the time graph, the searching the subject dictionary, and the creating the set of linkages.

16. A computer program product, comprising a computer-readable hardware storage device of a profile-management system, wherein the storage device stores a computer-readable program code configured to be executed by a processor of the profile-management system to implement a method for maintaining a multidimensional information repository for managing dynamic time-sensitive and space-sensitive user characteristics, wherein the multidimensional information repository comprises a profile set of user-profile records that each identifies a user profile of a plurality of user profiles, a geospatial-map set of location records that each identifies a location of a plurality of locations, a time-graph set of time-period records that each identifies a time period of a plurality of time periods, and a subject-dictionary set of subject-matter records that each identifies a subject of a plurality of subjects, the method comprising:
the profile-management system receiving an inbound event that is associated with a first user profile, a first location, a first time period, and a first subject;
the system searching the profile set for a user-profile record associated with the first user profile and adding such a record to the profile set if none already exists;
the system decreasing a first confidence level of the record if unable to identify the record in the profile set that exactly matches the first user profile associated with the inbound event;
the system searching the geospatial map for a location record associated with the first location and adding such a record to the geospatial map if none already exists;
the system zooming out the geospatial map and decreasing a second confidence level of the location record if unable to identify the location record that exactly matches the first location associated with the inbound event;
the system searching the time graph for a time-period record associated with the first time period and adding such a record to the time graph if none already exists;
the system searching the subject dictionary for a subject-matter record associated with the first subject and adding such a record to the subject dictionary if none already exists;
the system creating a set of space-sensitive and time-sensitive linkages, wherein the linkages link the record associated with the first user profile to the record associated with the first location, the record associated with the first time period, and the record associated with the first subject;
the system continuously self-learning by recognizing the set of space-sensitive and time-sensitive linkages in user behaviors represented by objects and the linkages and using self-learned observations to infer user behavioral patterns in the user-profile records;
the system dynamically and automatically updates the set of space-sensitive and time-sensitive linkages in response to a modification of the inbound event; and
the system increasing a confidence factor of query results by adding space-sensitive context and time-sensitive context to a query.

17. The computer program product of claim 16, wherein the method further comprises:
the system automatically updating the set of space-sensitive and time-sensitive linkages in response to a change in a characteristic of the first user profile.

18. The computer program product of claim 16, wherein one or more of the set of space-sensitive and time-sensitive linkages are inferred from a time at which the system receives the inbound event and a location from which the inbound event was sent.

19. The computer program product of claim 16, wherein the method further comprises:
the system receiving a profile request that identifies a requested user profile of the plurality of user profiles;
the system selecting from the profile set a second user-profile record that is associated with the requested user profile, wherein a second space linkage links the second user-profile record to a second location, a second time linkage links the second user-profile record to a second time period, and a second subject linkage links the second user-profile record to a second subject;
the system selecting from the geospatial map a second location record that is associated with the second location;
the system selecting from the time graph a second time-period record that is associated with the second time period; and
the system selecting from the subject dictionary a second subject-matter record that is associated with the second subject,
wherein the system selects the second user-profile record by first attempting to select a record in the profile set that exactly matches the requested user profile and, if unable to identify such a record, instead selecting a record in the profile set that most closely matches the requested user profile,
wherein the system selects the second location record by first attempting to select a record in the geospatial map that exactly matches the second location and, if unable to identify such a record, instead selecting a record in the geospatial map that most closely matches the second location,
wherein the system selects the second time-period record by first attempting to select a record in the time graph that exactly matches the second time period and, if unable to identify such a record, instead selecting a record in the time graph that most closely matches the second time period, and
wherein the system selects the second subject-matter record by first attempting to select a record in the subject dictionary that exactly matches the second subject and, if unable to identify such a record, instead selecting a record in the subject dictionary that most closely matches the second subject.

20. The computer program product of claim 19, wherein:
the system increases a value of a third confidence level if able to identify in the profile set a record that exactly matches the requested user profile and decreases the value of the third confidence level if unable to identify a record in the profile set that exactly matches the requested user profile,
the system increases a value of a fourth confidence level if able to identify in the geospatial map a record that exactly matches the second location and decreases the value of the fourth confidence level if unable to identify a record in the geospatial map that exactly matches the second location,
the system increases a value of a fifth confidence level if able to identify in the time graph a record that exactly matches the second time period and decreases the value of the fifth confidence level if unable to identify a record in the time graph that exactly matches the second time period, and
the system increases a value of a sixth confidence level if able to identify in the subject dictionary a record that exactly matches the second subject and decreases the value of the sixth confidence level if unable to identify a record in the subject dictionary that exactly matches the second subject.

* * * * *